May 31, 1927. 1,630,834

J. DERRY

TIRE WRAPPING MACHINE

Filed Feb. 1, 1926 3 Sheets-Sheet 2

Fig-2-

INVENTOR=
Jasper Derry,
By Macleod, Calver, Copeland + Dike,
Attys.

May 31, 1927.

J. DERRY 1,630,834

TIRE WRAPPING MACHINE

Filed Feb. 1, 1926

INVENTOR
Jasper Derry,
by MacLeod, Calvert, Copeland & Dike,
Attys.

Patented May 31, 1927.

1,630,834

UNITED STATES PATENT OFFICE.

JASPER DERRY, OF MEDFORD, MASSACHUSETTS, ASSIGNOR TO ANDREW TERKELSEN, OF BOSTON, MASSACHUSETTS.

TIRE-WRAPPING MACHINE.

Application filed February 1, 1926. Serial No. 85,183.

This invention relates to wrapping machines of the general type shown and described in an application for Letters Patent filed August 22, 1923, Serial No. 658,767 by Jasper Derry, the present machine as in said previous application being particularly designed and adapted for wrapping annular articles or objects, such as tires, coils of wire, hose, etc.

It is important that machines of this type be adapted for wrapping objects, such as, tires, of different sizes, and in practice it is objectionable and expensive when considerable adjustment of the machine is necessary for each different size tire. Frequently the tires to be wrapped successively in the factory are delivered to the wrapping machine in unsorted lots as to sizes, and hence where repeated adjustment of the machine is necessary, considerable time is lost which increases the cost of production.

As in the machine shown and described in the above application, the tire or other object is supported on a pair of rollers which are rotated to advance the work through an annular shuttle, the latter applying the helical windings of a strip to the article. In said application one of the supporting rollers was mounted for vertical adjustment so as to adjust each different size tire and locate the lower portion thereof in such position that the wrapping strip at both edges thereof would engage the tire uniformly and with equal pressure.

An object of the present invention is to eliminate the necessity of adjusting the supporting means of the tire, or article to be wrapped, in order to provide the proper surface engagement of the strip and tire. In this invention the supporting rollers are so positioned with relation to each other and to the guide means for the strip carried by the shuttle, when centered with respect to the tire, that tires or articles of various sizes may be supported on the rollers and at the same time have the lower portion of each tire automatically located in the proper relation to the strip without any adjustment. In other words, I have provided a machine in which it is only necessary for the operator to center the shuttle with respect to the tire or article, and no adjustment is necessary for obtaining for each different size tire or object the proper inclination of winding of the strip and the proper surface contact or engagement of the strip with the object or tire.

Other objects of this invention will appear in the following description and appended claims, reference being had to the accompanying drawings forming a part of this specification wherein like reference characters designate corresponding parts in the several views and wherein:

Figure 1:
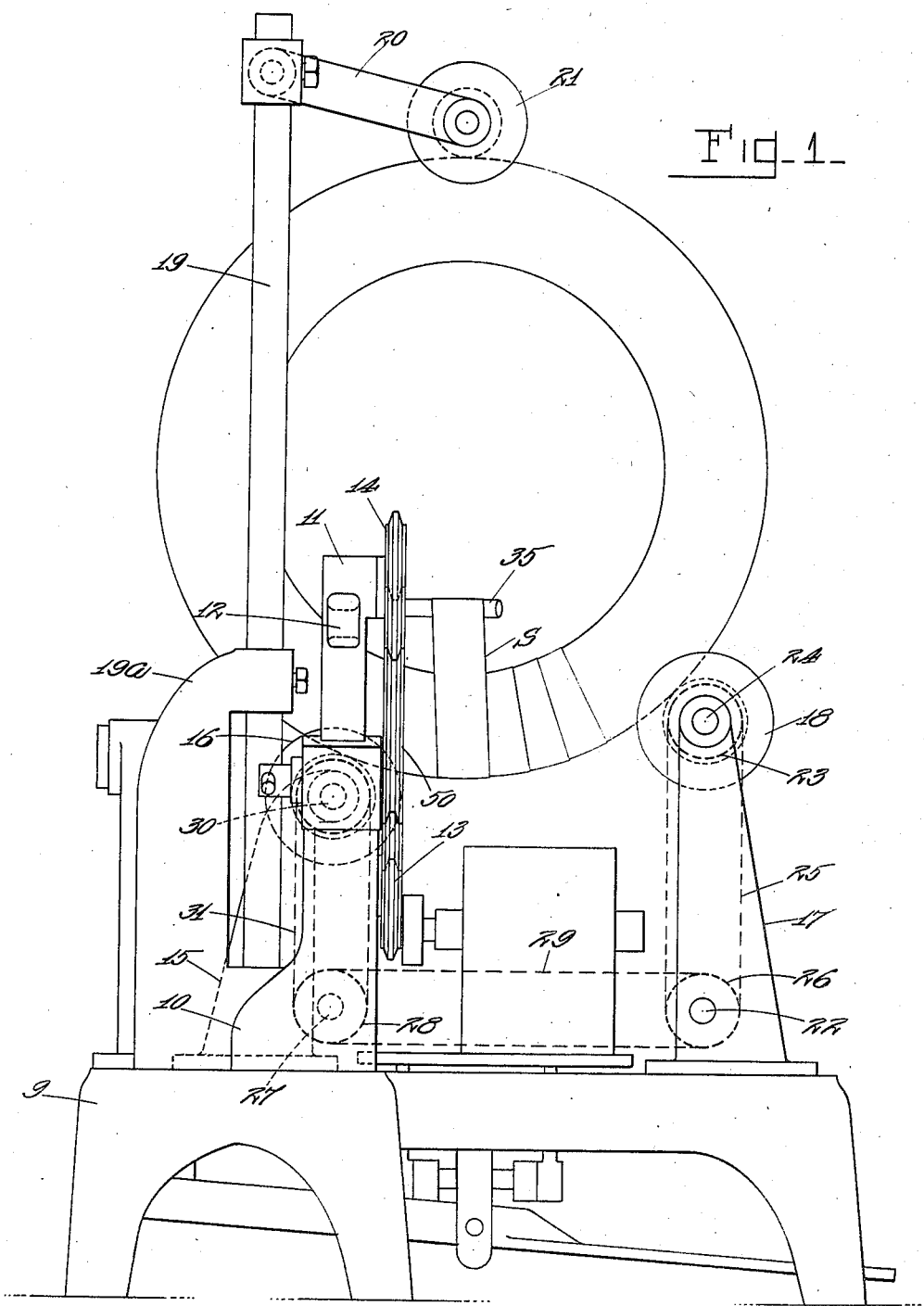
Fig. 1 is a front elevation illustrating a machine embodying my invention.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

Referring to the drawings wherein I have illustrated a present preferred form of my invention, it will be seen that the machine comprises a base 9, and rising therefrom is a standard or support 10. A swinging yoke 11 is pivotally supported at one end thereof (not shown) and is adjustably connected to the standard 10, the yoke 11 carrying a handle 12 by means of which the yoke may be manipulated. A further detailed description of this construction is not deemed necessary, since machines of this general type are well known, being shown, for example, in Letters Patent No. 1,413,776, issued April 25, 1922, to George W. Prouty. Rotatably mounted on a stud extending from the yoke 11 is a guide roller or disk 13, and at the upper end of the yoke is similarly mounted a roller 14. A rotary shuttle 50 is supported on the rollers 13 and 14 and may be driven by friction rollers or disks (not shown) at the opposite side of the machine as in the above mentioned application. From the foregoing construction it will be seen that the shuttle 50 may be adjusted so as to center it with respect to the tire by adjusting the yoke 11.

Rising from the base 9 is a standard 15 carrying at its upper end a roller 16, and at the opposite end of the base is mounted a standard 17 carrying at its upper end a roller 18. The tire or other object to be wrapped is supported upon the rollers 16 and 18. Extending from the base of the machine is a vertical post 19 supported in a bracket 19a, and having at the upper end a swinging arm 20 carrying a weighted roller 21. This roller is adapted to engage the tire and assist in guiding the same.

The rollers 16 and 18 are rotated by means of suitable driving connections so as to rotate the tire at a constant speed. The driving connections are indicated in general in Fig. 1 and as shown may comprise a driven shaft 22 carrying a sprocket 26 which is connected by means of a chain 25 to a suitable sprocket 23 on the shaft 24, this shaft carrying the driving roller 18 for the tire. The opposite roller 16 may be driven from the shaft 22 by means of a chain 29 connected to a sprocket 28 mounted on a shaft 27. The shaft 30 which carries the roller 16 is provided with a sprocket driven through a chain 31 from the sprocket 28.

The wrapping material which in the present instance is in the form of a continuous strip S of paper is fed from a suitable roll 32 mounted on a stud 33 carried by the shuttle 50. The strip S passes through a folding device 34 and over a stud or guide 35, thence being conducted to the tire or other object to be wrapped. The strip if desired may be led off directly from the folding device 34.

Figure 2:
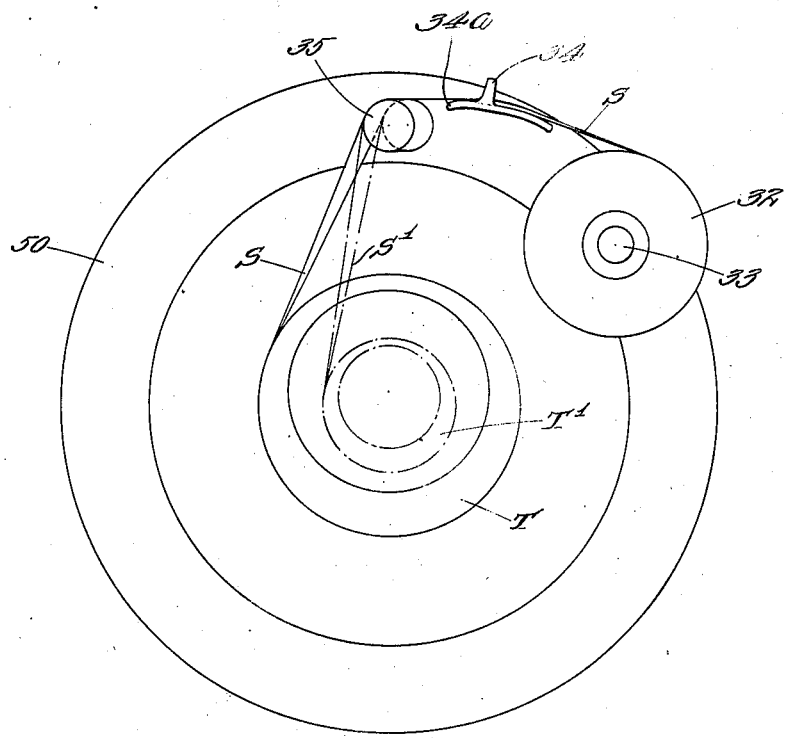
Fig. 2 is a detail diagrammatic view showing the manner in which the strip is guided to tires of different sizes.
Figure 4:
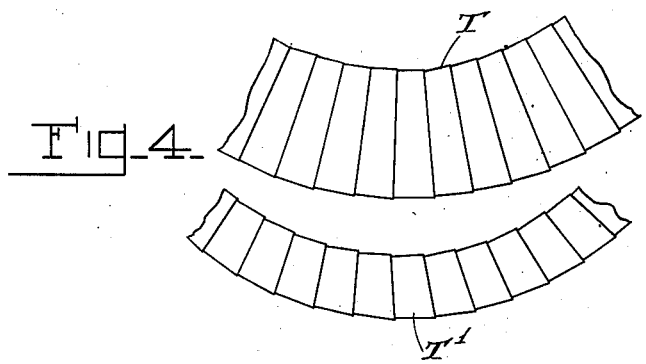
Fig. 4 is a fragmentary view showing tires of different sizes wrapped with strips applied at different inclinations.

It is important that the successive windings of the strip S overlap one another on the work to substantially the same extent irrespective of the thickness of the work or tire. To accomplish this, as shown in Fig. 4, it is necessary that the strip be wound at a greater inclination on the relatively small tire T' than upon the relatively large tire T. It will be seen by reference to Fig. 2, that this guide or stud 35 extends at an inclination to the face of the shuttle 50 and to the path of the strip as it is conducted thereto from the roll 32. Thus, with the shuttle rotating in a vertical plane, the guide 35 is horizontally inclined, the axis of the guide extending at an oblique angle to the axis of the shuttle. This angular or inclined lead-off edge of the guide 35 causes uniform strain to be placed upon the opposite edges of the strip S irrespective of the different inclinations in which the strip is led off to different size tires. I may do away with the stud 35 and cause the strip S to be led off directly from the folder 34. In this instance the lead-off edge 34a of the folder will have the same inclination as the stud 35 and curved or convex shaped at such edge as shown at Fig. 2.

Figure 3:
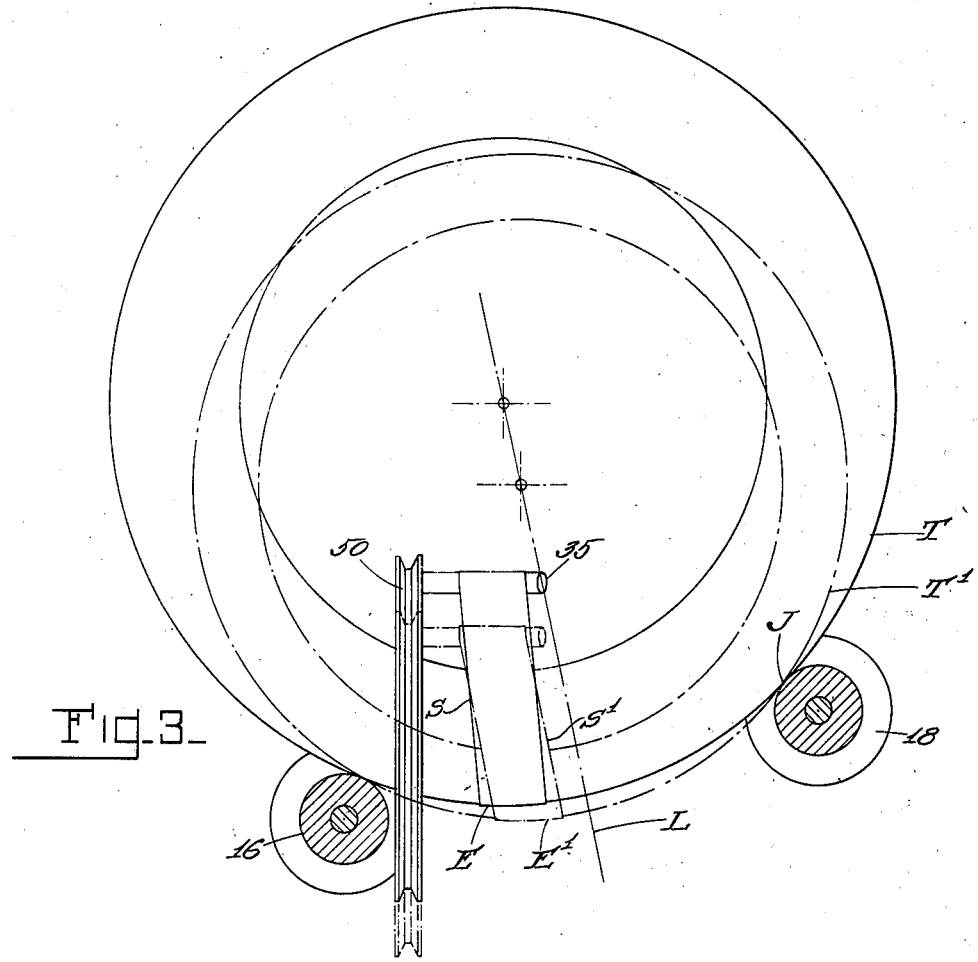
Fig. 3 is a detail diagrammatic view illustrating the manner in which the tires of different sizes are supported and the relation thereof to the strip as it is conducted to each tire.

It will be seen, referring particularly to Fig. 3, that the supporting roller 18 is located higher than the roller 16, and at a relatively greater distance at one side of the vertical lines passing through the several centers of the tires of different sizes. I have discovered that with the tires of different sizes, two being herein shown at T and T', properly positioned so that the lower portions thereof will be in the proper positions to be engaged evenly by the strip S at E and E', the rollers 16 and 18 may be positioned substantially at definite points in relation to the locus of centers of the several tires indicated by line L. The centers of rollers 16 and 18, disregarding any slight variable conditions, will be substantially equidistant from the locus L of the centers of the several tires.

It will be seen that the roller 18 is thus positioned substantially at such predetermined point that it will engage the several different sized tires at a point J which is the intersection of the circles representing the peripheries of the different size tires. As a result, assuming that the shuttle 50 has been centered with respect to the tire, the strip S which is automatically led off from the stud 35 at the proper inclination to the tire, will automatically engage the tire at E or E' so that uniform pressure or strain will be exerted on each edge of the strip during the wrapping operation. The supporting rolls 16 and 18 therefore support the different size tires or other annular articles without requiring adjustment for the purpose of causing the opposite edges of the inclined strip to engage the tire uniformly and with equal pressure or strain thereon, to prevent breaking or tearing of the strip. As a present means for carrying out or practicing my invention, therefore, the supporting rolls are fixed or at constant points requiring no adjustment, and with the tire rotated in a vertical plane it will be seen that the line of centers of the rolls is vertically inclined, one roll being supported at the constant higher point than the others.

It is to be understood that by describing in detail herein any particular form, structure, or arrangement, it is not intended to limit the invention beyond the terms of the several claims or the requirements of the prior art.

What I claim is:

1. In a wrapping machine for applying helical windings of a strip to annular articles of different sizes, in combination, an adjustably positioned rotatable shuttle carrying a strip to be wrapped around the article, and a plurality of fixed work supporting members located one above the other on opposite sides of said shuttle.

2. In a wrapping machine for applying helical windings of a strip to annular articles of different sizes, in combination, an adjustably positioned rotatable shuttle carrying a strip to be wrapped around the article, and a plurality of fixed work supporting members located at opposite sides of said shuttle and at different distances from a vertical plane passing through the center of the article supported.

3. In a wrapping machine for applying helical windings of a strip to annular articles of different sizes, in combination, an adjustable yoke supporting a rotatable shuttle carrying a strip to be wrapped around the article, and a pair of fixed work supporting rollers located one above the other on opposite sides of said shuttle.

4. In a wrapping machine for applying helical windings of a strip to annular articles of different sizes, in combination, an adjustable yoke supporting a rotatable shuttle carrying a strip to be wrapped around the article, and a pair of fixed work supporting rollers located at opposite sides of said shuttle and at different distances from a vertical plane passing through the center of the article supported.

5. In a wrapping machine for applying helical windings of a strip to annular articles of different sizes, in combination, an adjustably positioned rotatable shuttle carrying a strip to be wrapped around the article, and a plurality of fixed work supporting members located one above the other on opposite sides of said shuttle and at different distances from a vertical plane passing through the center of the article supported.

In testimony whereof I affix my signature.

JASPER DERRY.